US010849715B2

(12) United States Patent
Detrik-Hartenberger et al.

(10) Patent No.: US 10,849,715 B2
(45) Date of Patent: Dec. 1, 2020

(54) DENTAL INSTRUMENT FOR CREATING NATURAL OCCLUSAL ANATOMY IN DENTAL RESTORATIONS

(71) Applicant: The THRIVE Dentists LLC, Los Ranchos, NM (US)

(72) Inventors: Galen Detrik-Hartenberger, Los Ranchos, NM (US); David Martin, Albuquerque, NM (US)

(73) Assignee: The THRIVE Dentists LLC, Los Ranchos, NM (US)

( * ) Notice: Subject to any disclaimer, the term of this patent is extended or adjusted under 35 U.S.C. 154(b) by 45 days.

(21) Appl. No.: 16/212,477

(22) Filed: Dec. 6, 2018

(65) Prior Publication Data
US 2020/0179081 A1 Jun. 11, 2020

(51) Int. Cl.
*A61C 3/00* (2006.01)
*A61C 5/73* (2017.01)
*A61C 13/00* (2006.01)
*A61C 13/08* (2006.01)

(52) U.S. Cl.
CPC ............... *A61C 3/00* (2013.01); *A61C 5/73* (2017.02); *A61C 13/0004* (2013.01); *A61C 13/08* (2013.01)

(58) Field of Classification Search
CPC ....... A61C 13/00; A61C 5/73; A61C 13/0004; A61C 13/08
USPC ......................................... 433/141, 147, 164
See application file for complete search history.

(56) References Cited

U.S. PATENT DOCUMENTS

| | | | | |
|---|---|---|---|---|
| 1,579,968 A * | 4/1926 | Taylor | ........... | A61C 3/08 433/164 |
| 1,676,715 A * | 7/1928 | Snyder | ........... | A61C 3/08 433/163 |
| 4,586,901 A * | 5/1986 | Tanaka | ........... | A61C 3/08 433/147 |
| 5,242,302 A * | 9/1993 | Riehm | ........... | A61C 3/08 433/164 |
| 5,697,787 A * | 12/1997 | Schumacher | ........... | A61K 6/16 433/226 |
| 2003/0186195 A1* | 10/2003 | Comfort | ........... | A61C 3/08 433/164 |
| 2005/0100860 A1* | 5/2005 | Kameli | ........... | A61C 3/00 433/144 |
| 2008/0014553 A1* | 1/2008 | Garrison | ........... | A61C 3/08 433/164 |
| 2009/0042165 A1* | 2/2009 | Garrison | ........... | A61C 3/00 433/164 |
| 2009/0130628 A1* | 5/2009 | Viscomi | ........... | A61C 3/08 433/164 |
| 2012/0301848 A1* | 11/2012 | O'Donnell | ........... | A61C 5/50 433/164 |

* cited by examiner

*Primary Examiner* — Nicholas D Lucchesi
(74) *Attorney, Agent, or Firm* — Kilpatrick Townsend & Stockton LLP

(57) ABSTRACT

A dental instrument for shaping an occlusal surface of a dental restoration includes a handle portion and an end member. The end member includes an elongated portion and a working end portion. The elongated portion is coupled with the handle portion and extends to the working end portion. The working end portion includes a concave surface shaped to be interfaced with a dental restoration material to shape the dental restoration material to form a convex occlusal surface of the dental restoration.

18 Claims, 4 Drawing Sheets

DENTAL INSTRUMENT FOR CREATING NATURAL OCCLUSAL ANATOMY IN DENTAL RESTORATIONS

BACKGROUND

Dental composite resins are used in dentistry as restorative materials or adhesives. For example, a dental composite resin can be used as a filling material following removal of a decayed and/or damaged portion of a tooth. The dental composite resin can be applied to the remaining portion of the tooth in an uncured state. Following application of the uncured resin, the resin is cured via exposure to a blue wavelength light (typically 470 nm). Since the light does not penetrate more than 2 to 3 mm into the resin, a deep filling must be formed incrementally to avoid forming uncured regions in the filling. Moreover, care must be taken not to form occlusal surfaces of the filling too high, which can result in chewing related tooth sensitivity, which can result in chewing related tooth sensitivity, and possible temporomandibular joint dysfunction (TMD) over time.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Dental instruments for shaping occlusal surfaces of a dental restoration include one or more working end portions shaped to be interfaced with a dental restoration material (e.g., a dental composite resin) to shape the dental restoration to form a convex occlusal surface of the dental restoration. In many embodiments, the working end portion includes a concave surface shaped to create the convex occlusal surface of the dental restoration. In many embodiments, the concave surface of the working end portion has a radius of curvature selected to produce a suitable complementarily shaped convex occlusal surface having the same radius of curvature, thereby enabling efficient, effective, and consistent creation of occlusal surfaces of the dental restoration.

Thus, in one aspect, a dental instrument for shaping an occlusal surface of a dental restoration is disclosed. The dental instrument includes a handle portion and an end member coupled with the handle portion. Any suitable approach can be used to fabricate the dental instrument. For example, the dental instrument can be monolithically formed from a piece of material. As another example, the handle portion and the end member can be separately formed and then the end member can be coupled with the handle portion. The end member includes an elongated portion and a working end portion. The elongated portion is coupled with the handle portion and extends to the working end portion. The working end portion including a concave surface shaped to be interfaced with a dental restoration material to shape the dental restoration material to form a convex occlusal surface of the dental restoration.

In many embodiments, the working end portion includes a circumferential rim and a distal tip. In such embodiments, the concave surface extends from the circumferential rim and converges to the distal tip so as to be offset from a line tangent to the circumferential rim and the distal tip. In many embodiments, the concave surface is axially symmetric to a working end portion axis that extends through the distal tip. In many embodiments, the circumferential rim includes a circumferential rim convex surface shaped to be interfaced with the dental restoration material to shape the dental restoration material to form a concave occlusal surface of the dental restoration. In some embodiments, the circumferential rim convex surface includes a toroidal surface segment.

In many embodiments, the handle portion is elongated along a handle axis and the working end portion extends a suitable distance from an end of the handle portion. In many embodiments, the working end portion axis is oriented between 45 and 135 degrees relative to the handle axis. In many embodiments, the working end portion axis is oriented between 80 and 100 degrees relative to the handle axis. In many embodiments, the working end portion axis is oriented at about 90 degrees relative to the handle axis. In many embodiments, the working end portion is disposed between 30 mm and 50 mm from the handle portion.

The working end portion can have any suitable configuration for use in forming an occlusal surface of a dental restoration. For example, in many embodiments, the circumferential rim has a maximum diameter of less than 5.0 mm. In some embodiments, the maximum diameter of the circumferential rim is between 3.0 mm and 4.0 mm, the distal tip is disposed between 1.5 mm and 1.8 mm from a plane extending through the circumferential rim at the maximum diameter of the circumferential rim, and/or the concave surface has a radius of curvature between 1.7 mm and 2.3 mm. In some embodiments, the maximum diameter of the circumferential rim is between 2.0 mm and 3.0 mm, the distal tip is disposed between 1.1 mm and 1.5 mm from a plane extending through the circumferential rim at the maximum diameter of the circumferential rim, and/or the concave surface has a radius of curvature between 0.9 mm and 1.5 mm. In some embodiments, the maximum diameter of the circumferential rim is between 3.0 mm and 4.0 mm, the distal tip is disposed between 1.1 mm and 1.5 mm from a plane extending through the circumferential rim at the maximum diameter of the circumferential rim, and/or the concave surface has a radius of curvature between 1.2 mm and 1.8 mm. In some embodiments, the maximum diameter of the circumferential rim is between 2.0 mm and 3.0 mm, the distal tip is disposed between 1.1 mm and 1.5 mm from a plane extending through the circumferential rim at the maximum diameter of the circumferential rim, and/or the concave surface has a radius of curvature between 2.2 mm and 2.8 mm.

Thus, in one aspect, a dental instrument for shaping occlusal surfaces of one or more dental restorations is disclosed. The dental instrument includes a handle portion, a first end member, and a second end member. The handle portion has a handle portion first end and a handle portion second end. The first end member includes a first elongated portion and a first working end portion. The first elongated portion is coupled with the handle portion first end and extends to the first working end portion. The first working end portion includes a first concave surface shaped to be interfaced with a first dental restoration material to shape the first dental restoration material to form a first convex occlusal surface of the one or more dental restorations. A second end member includes a second elongated portion and a second working end portion. The second elongated portion is coupled with the handle portion second end and extends to the second working end portion. The second working end portion includes a second concave surface shaped to be interfaced with a second dental restoration material to shape the second dental restoration material to form a second convex occlusal surface of the one or more dental restorations. The second concave surface has a smaller radius of curvature than the first concave surface.

In some embodiments, the dental instrument for shaping occlusal surfaces of one or more dental restorations is configured for use in shaping occlusal surfaces of either the upper jaw or the lower jaw. For example, when the dental instrument is configured for use in shaping occlusal surfaces of the upper jaw, the first working end portion can include a first circumferential rim and a first distal tip; the first concave surface can extend from the first circumferential rim and converge to the first distal tip so as to be offset from a first line tangent to the first circumferential rim and the first distal tip; the first circumferential rim can have a first maximum diameter of between 3.0 mm and 4.0 mm, the first distal tip can be disposed between 1.5 mm and 1.8 mm from a first plane extending through the first circumferential rim at the first maximum diameter of the first circumferential rim; the first concave surface can have a radius of curvature between 1.7 mm and 2.3 mm; the second working end portion can include a second circumferential rim and a second distal tip; the second concave surface can extend from the second circumferential rim and converge to the second distal tip so as to be offset from a second line tangent to the second circumferential rim and the second distal tip; the second circumferential rim can have a second maximum diameter of between 2.0 mm and 3.0 mm; the second distal tip can be disposed between 1.1 mm and 1.5 mm from a second plane extending through the second circumferential rim at the second maximum diameter of the second circumferential rim; and the second concave surface can have a radius of curvature between 0.9 mm and 1.5 mm. When the dental instrument is configured for use in shaping occlusal surfaces of the lower jaw, the first working end portion can include a first circumferential rim and a first distal tip; the first concave surface can extend from the first circumferential rim and converge to the first distal tip so as to be offset from a first line tangent to the first circumferential rim and the first distal tip; the first circumferential rim can have a first maximum diameter of between 3.0 mm and 4.0 mm; the first distal tip can be disposed between 1.1 mm and 1.5 mm from a first plane extending through the first circumferential rim at the first maximum diameter of the first circumferential rim; and the first concave surface can have a radius of curvature between 1.2 mm and 1.8 mm; the second working end portion can include a second circumferential rim and a second distal tip; the second concave surface can extend from the second circumferential rim and converges to the second distal tip so as to be offset from a second line tangent to the second circumferential rim and the second distal tip; the second circumferential rim can have a first maximum diameter of between 2.0 mm and 3.0 mm; the second distal tip can be disposed between 1.1 mm and 1.5 mm from a second plane extending through the second circumferential rim at the second maximum diameter of the second circumferential rim; and the second concave surface can have a radius of curvature between 2.2 mm and 2.8 mm.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
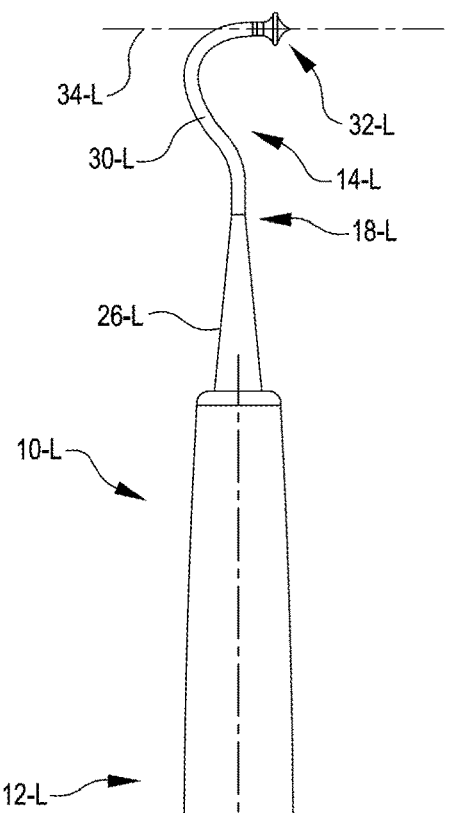
FIG. 1 shows a dental tool for shaping occlusal surfaces of lower jaw dental restorations, in accordance with embodiments.

Referring now to the drawings, in which like reference numerals represent like parts throughout the several views, FIG. 1 shows a dental tool 10-L for shaping occlusal surfaces of lower jaw dental restorations, in accordance with embodiments. The dental tool 10-L includes a handle portion 12-L, a first end member 14-L, and a second end member 16-L. The handle portion 12-L has a handle portion first end 18-L and a handle portion second end 20-L. The handle portion 12-L is elongated along a handle axis 22-L that extends through the handle portion first end 18-L and the handle portion second end 20-L.

The handle portion 12-L can have any suitable configuration. For example, in the illustrated embodiment, the handle portion 12-L includes a central handle portion member 24-L, a first end adapter member 26-L, and a second end adapter member 28-L. The central handle portion member 24-L, the first end adapter member 26-L, and the second end adapter member 28-L can have any suitable configuration and be made from any suitable material. In the illustrated embodiment, the central handle portion member 24-L is made from anodized aluminum, is 12.0 mm wide (perpendicular to the handle axis 22), and is 100.0 mm long (parallel to the handle axis 22-L); and each of the end adapter members 26-L, 28-L is made from stainless steel. Each of the end adapter members 26-L, 28-L is configured to fixedly secure the corresponding end member 14-L, 16-L to the central handle portion member 24-L.

The first end member 14-L has a first elongated portion 30-L and a first working end portion 32-L. The first elongated portion 30-L is fixedly coupled with the handle portion 12-L. The first elongated portion 30-L extends from the handle portion first end 18-L to the first working end portion 32-L to support the first working end portion 32-L in a fixed position and orientation relative to the handle portion 12-L. The first elongated portion 30-L can have any suitable configuration. In the illustrated embodiment, the first elongated portion 30-L includes a "shepherd's hook" shaped portion. The first working end portion 32-L is aligned with a first working end portion axis 34-L. In the illustrated embodiment, the first working end portion axis 34-L is perpendicular to the handle axis 22-L. The angle between the first working end portion axis 34-L and the handle axis 22-L can be any suitable angle. For example, the angle between the first working end portion axis 34-L and the handle axis 22-L can be from 45 to 135 degrees. In some preferred embodiments, the angle between the first working end portion axis 34-L and the handle axis 22-L is from 80 to 100 degrees. In some embodiments, the angle between the first working end portion axis 34-L and the handle axis 22-L is about 90 degrees. Any suitable approach can be used to fabricate the first end member 14-L. For example, the first end member 14-L can be integrally formed from any suitable material (e.g., titanium nitride coated stainless steel).

The second end member 16-L has a second elongated portion 36-L and a second working end portion 38-L. The second elongated portion 36-L is fixedly coupled with the handle portion 12-L. The second elongated portion 36-L extends from the handle portion second end 20-L to the second working end portion 38-L to support the second working end portion 38-L in a fixed position and orientation relative to the handle portion 12-L. The second elongated portion 36-L can have any suitable configuration. In the illustrated embodiment, the second elongated portion 36-L includes a "shepherd's hook" shaped portion. The second working end portion 38-L is aligned with a second working end portion axis 40-L. In the illustrated embodiment, the second working end portion axis 40-L is perpendicular to the handle axis 22-L. The angle between the second working end portion axis 40-L and the handle axis 22-L can be any suitable angle. For example, the angle between the second working end portion axis 40-L and the handle axis 22-L can be from 45 to 135 degrees. In some preferred embodiments, the angle between the second working end portion axis 40-L and the handle axis 22-L is from 80 to 100 degrees. In some embodiments, the angle between the second working end portion axis 40-L and the handle axis 22-L is about 90 degrees. Any suitable approach can be used to fabricate the second end member 16-L. For example, the second end member 16-L can be integrally formed from any suitable material (e.g., titanium nitride coated steel gold).

Figure 2:
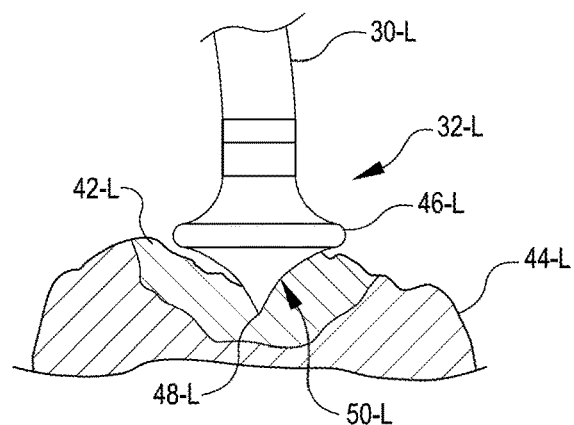
FIG. 2 shows a first working end portion of a first end member of the dental tool of FIG. 1.
Figure 3:
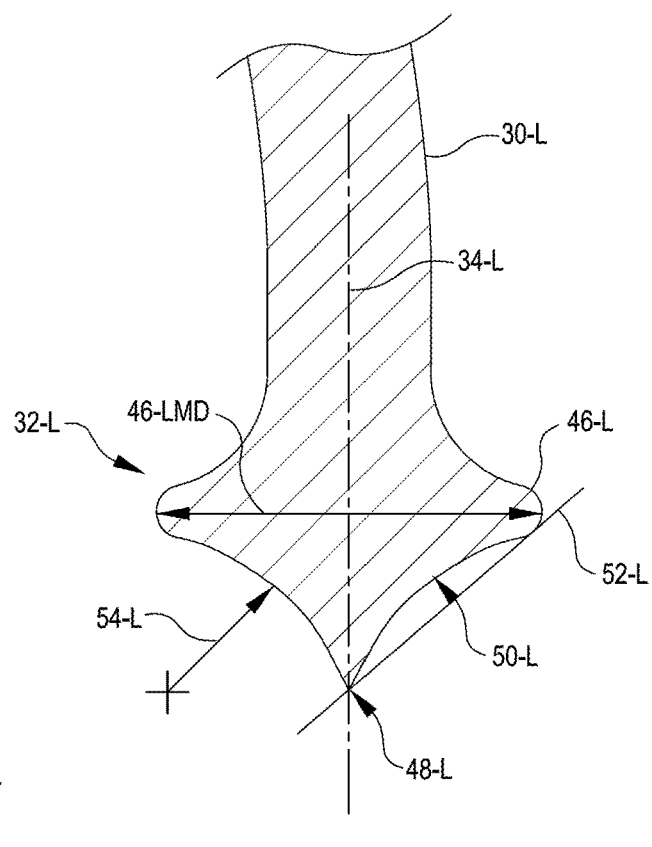
FIG. 3 is a cross-sectional view of the first working end portion of the dental tool of FIG. 1.

FIG. 2 is a close-up view of a first end portion of the dental tool 10-L showing the first end working portion 32-L engaged with a dental restoration material 42-L applied to a lower jaw tooth 44-L. In many embodiments, the first end working portion 32-L includes a circumferential rim 46-L, a distal tip 48-L, and a concave surface 50-L that extends between the circumferential rim 46-L and the distal tip 48-L. The concave surface 50-L is adapted to be engaged with the dental restoration material 42-L to form a complementarily-shaped convex surface in the dental restoration material 42-L. The concave surface 50-L can have any suitable convex shape. For example, as illustrated in FIG. 3, in many embodiments, such as in the illustrated embodiment, the concave surface 50-L is offset inwardly from a line 52-L tangent to the circumferential rim 46-L and the distal tip 48-L toward the first working end portion axis 34-L. In the illustrated embodiment, the concave surface 50-L has a cross-sectional radius 54-L equal to 1.5 mm. The concave surface 50-L can, however, have any suitable curvature(s). For example, the concave surface 50-L can have the cross-sectional radius (radii) from 1.2 mm to 1.8 mm.

In many embodiments, external surfaces of the first end working portion 32-L (including external surfaces of the circumferential rim 46-L, the distal tip 48-L, and the concave surface 50-L) are surfaces of revolution axially symmetric to the first working end portion axis 34-L. Any suitable configuration of the first end working portion 32-L, however, including non-axially symmetric embodiments of the first end working portion 32-L that include a suitable concave surface 50-L configured to generate a desired complementarily-shaped convex occlusal surface in the dental restoration material 42-L, can be employed.

In the illustrated embodiment, the circumferential rim 46-L has an protruding convex surface shaped for engagement with the dental restoration material 42-L to form a complementarily-shaped concave occlusal surface in the dental restoration material 42-L. The dental tool 10-L can be positioned and oriented to orient the protruding convex surface of the circumferential rim 46-L for engagement with the dental restoration material 42-L. The circumferential rim 46-L can have any suitable protruding convex surface shape. For example, in the illustrated embodiment, the circumferential rim 46-L has a protruding convex surface that includes a toroidal surface segment with a cross-sectional radius equal to 0.25 mm. In the illustrated embodiment, the circumferential rim 46-L has a maximum diameter 46-LMD equal to 3.5 mm. The circumferential rim 46-L, however, can have any suitable maximum diameter 46-LMD (e.g., 3.0 mm to 4.0 mm). In the illustrated embodiment, the distal tip 48-L is disposed 1.3 mm from a plane extending through the circumferential rim 46-L at the maximum diameter 46-LMD. The distal tip 48-L, however, can be disposed at any suitable distance (e.g., 1.1 mm to 1.5 mm) from the plane extending through the circumferential rim 46-L at the maximum diameter 46-LMD.

Figure 4:
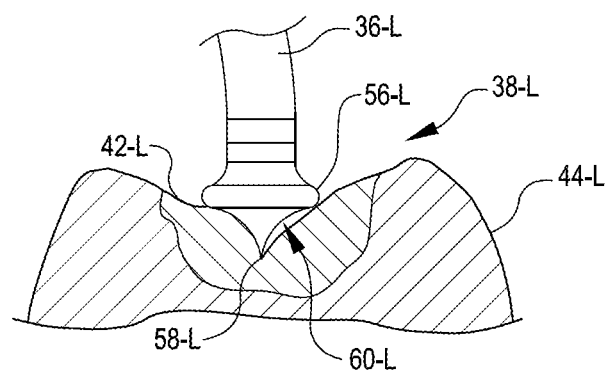
FIG. 4 shows a second working end portion of a second end member of the dental tool of FIG. 1.
Figure 5:
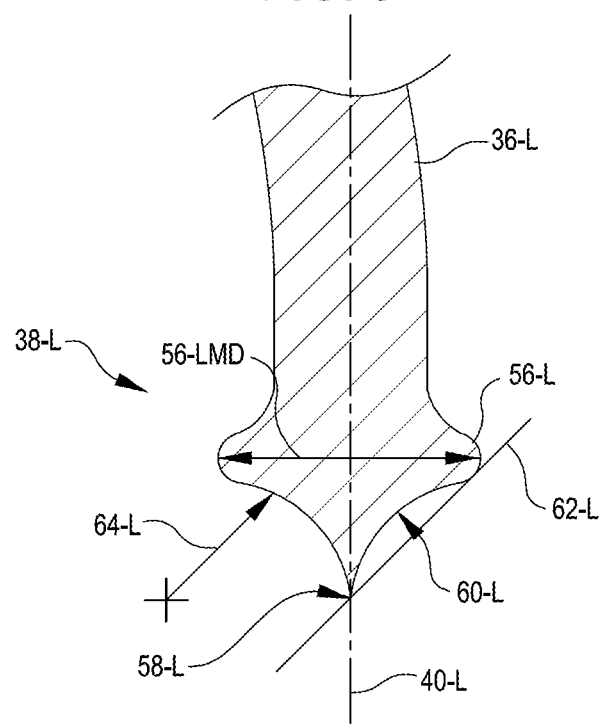
FIG. 5 is a cross-sectional view of the second working end portion of the dental tool of FIG. 1.

FIG. 4 is a close-up view of a second end portion of the dental tool 10-L showing the second end working portion 38-L engaged with a dental restoration material 42-L applied to a lower jaw tooth 44-L. In many embodiments, the second end working portion 38-L includes a circumferential rim 56-L, a distal tip 58-L, and a concave surface 60-L that extends between the circumferential rim 56-L and the distal tip 58-L. The concave surface 60-L is adapted to be engaged with the dental restoration material 42-L to form a complementarily-shaped convex surface in the dental restoration material 42-L. The concave surface 60-L can have any suitable concave shape. For example, as illustrated in FIG. 5, in many embodiments, such as in the illustrated embodiment, the concave surface 60-L is offset inwardly from a line 62-L tangent to the circumferential rim 56-L and the distal tip 58-L toward the second working end portion axis 40-L. In the illustrated embodiment, the concave surface 60-L has a cross-sectional radius 64-L equal to 2.5 mm. The concave surface 60-L can, however, have any suitable curvature(s). For example, the concave surface 60-L can have the cross-sectional radius (radii) from 2.2 mm to 2.8 mm.

In many embodiments, external surfaces of the second end working portion 38-L (including external surfaces of the circumferential rim 56-L, the distal tip 58-L, and the concave surface 60-L) are surfaces of revolution axially symmetric to the second working end portion axis 38-L. Any suitable configuration of the second end working portion 38-L, however, including non-axially symmetric embodiments of the second end working portion 38-L that include a suitable concave surface 60-L configured to generate a desired complementarily-shaped convex occlusal surface in the dental restoration material 42-L, can be employed.

In the illustrated embodiment, the circumferential rim 56-L has an protruding convex surface shaped for engagement with the dental restoration material 42-L to form a complementarily-shaped concave occlusal surface in the dental restoration material 42-L. The dental tool 10-L can be positioned and oriented to orient the protruding convex surface of the circumferential rim 56-L for engagement with the dental restoration material 42-L. The circumferential rim 56-L can have any suitable protruding convex surface shape. For example, in the illustrated embodiment, the circumferential rim 56-L has a protruding convex surface that includes a toroidal surface segment with a cross-sectional radius equal to 0.25 mm. In the illustrated embodiment, the circumferential rim 56-L has a maximum diameter 56-LMD equal to 2.5 mm. The circumferential rim 56-L, however, can have any suitable maximum diameter 56-LMD (e.g., 2.0 mm to 3.0 mm). In the illustrated embodiment, the distal tip 58-L is disposed 1.3 mm from a plane extending through the circumferential rim 56-L at the maximum diameter 56-LMD. The distal tip 58-L, however, can be disposed at any suitable distance (e.g., 1.1 mm to 1.5 mm) from the plane extending through the circumferential rim 56-L at the maximum diameter 56-LMD.

Figure 6:
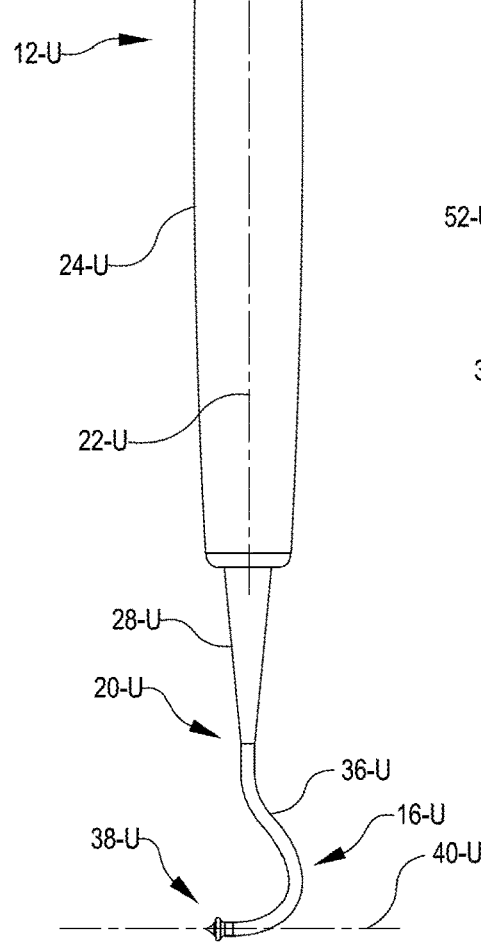
FIG. 6 shows a dental tool for shaping occlusal surfaces of upper jaw dental restorations, in accordance with embodiments.

FIG. 6 shows a dental tool 10-U for shaping occlusal surfaces of upper jaw dental restorations, in accordance with embodiments. The dental tool 10-U includes a handle portion 12-U, a first end member 14-U, and a second end member 16-U. The handle portion 12-U has a handle portion first end 18-U and a handle portion second end 20-U. The handle portion 12-U is elongated along a handle axis 22-U that extends through the handle portion first end 18-U and the handle portion second end 20-U.

The handle portion 12-U can have any suitable configuration. For example, in the illustrated embodiment, the handle portion 12-U includes a central handle portion member 24-U, a first end adapter member 26-U, and a second end adapter member 28-U. The central handle portion member 24-U, the first end adapter member 26-U, and the second end adapter member 28-U can have any suitable configuration. In the illustrated embodiment, the central handle portion member 24-U is made from anodized aluminum, is 12.0 mm wide (perpendicular to the handle axis 22), and is 100.0 mm long (parallel to the handle axis 22); and each of the end adapter members 26-U, 28-U is made from stainless steel. Each of the end adapter members 26-U, 28-U is configured to fixedly secure the corresponding end member 14-U, 16-U to the central handle portion member 24-U.

The first end member 14-U has a first elongated portion 30-U and a first working end portion 32-U. The first elongated portion 30-U is fixedly coupled with the handle portion 12-U. The first elongated portion 30-U extends from the handle portion first end 18-U to the first working end portion 32-U to support the first working end portion 32-U in a fixed position and orientation relative to the handle portion 12-U. The first elongated portion 30-U can have any suitable configuration. In the illustrated embodiment, the first elongated portion 30-U includes a "shepherd's hook" shaped portion. The first working end portion 32-U is aligned with a first working end portion axis 34-U. In the illustrated embodiment, the first working end portion axis 34-U is perpendicular to the handle axis 22-U. The angle between the first working end portion axis 34-U and the handle axis 22-U can be any suitable angle. For example, the angle between the first working end portion axis 34-U and the handle axis 22-U can be from 45 to 135 degrees. In some preferred embodiments, the angle between the first working end portion axis 34-U and the handle axis 22-U is from 80 to 100 degrees. In some embodiments, the angle between the first working end portion axis 34-U and the handle axis 22-U is about 90 degrees. Any suitable approach can be used to fabricate the first end member 14-U. For example, the first end member 14-U can be integrally formed from any suitable material (e.g., titanium nitride coated stainless steel).

The second end member 16-U has a second elongated portion 36-U and a second working end portion 38-U. The second elongated portion 36-U is fixedly coupled with the handle portion 12-U. The second elongated portion 36-U extends from the handle portion second end 20-U to the second working end portion 38-U to support the second working end portion 38-U in a fixed position and orientation relative to the handle portion 12-U. The second elongated portion 36-U can have any suitable configuration. In the illustrated embodiment, the second elongated portion 36-U includes a "shepherd's hook" shaped portion. The second working end portion 38-U is aligned with a second working end portion axis 40-U. In the illustrated embodiment, the second working end portion axis 40-U is perpendicular to the handle axis 22-U. The angle between the second working end portion axis 40-U and the handle axis 22-U can be any suitable angle. For example, the angle between the second working end portion axis 40-U and the handle axis 22-U can be from 45 to 135 degrees. In some preferred embodiments, the angle between the second working end portion axis 40-U and the handle axis 22-U is from 80 to 100 degrees. In some embodiments, the angle between the second working end portion axis 40-U and the handle axis 22-U is about 90 degrees. Any suitable approach can be used to fabricate the second end member 16-U. For example, the second end member 16-U can be integrally formed from any suitable material (e.g., titanium nitride coated steel gold).

Figure 7:
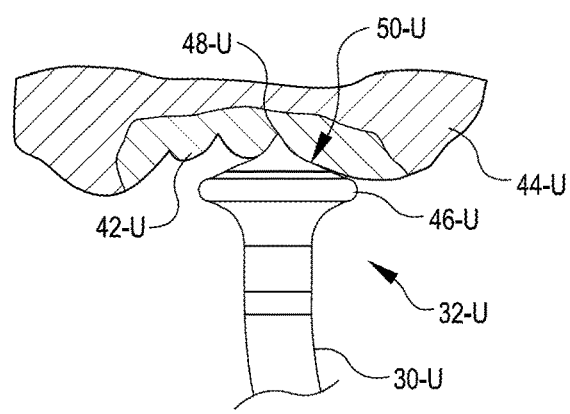
FIG. 7 shows a first working end portion of a first end member of the dental tool of FIG. 6.
Figure 8:
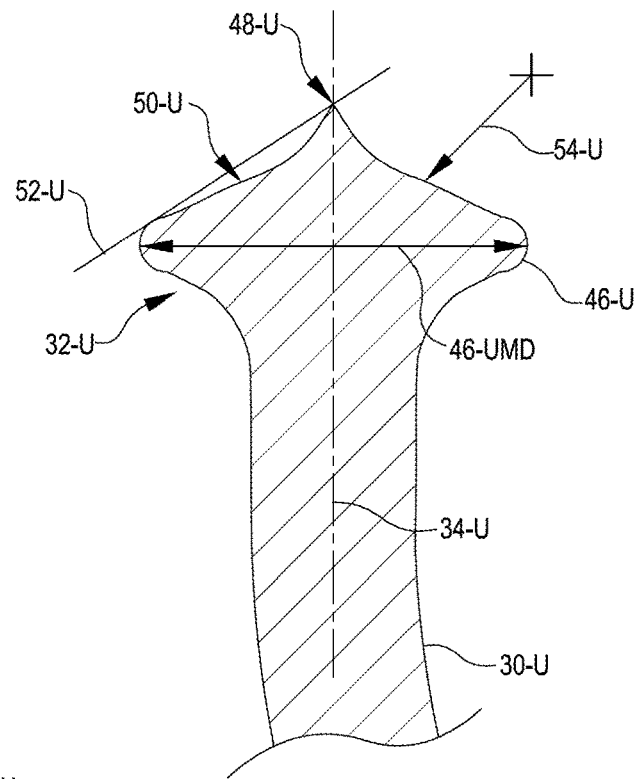
FIG. 8 is a cross-sectional view of the first working end portion of the dental tool of FIG. 6.

FIG. 7 is a close-up view of a first end portion of the dental tool 10-U showing the first end working portion 32-U engaged with a dental restoration material 42-U applied to a upper jaw tooth 44-U. In many embodiments, the first end working portion 32-U includes a circumferential rim 46-U, a distal tip 48-U, and a concave surface 50-U that extends between the circumferential rim 46-U and the distal tip 48-U. The concave surface 50-U is adapted to be engaged with the dental restoration material 42-U to form a complementarily-shaped convex surface in the dental restoration material 42-U. The concave surface 50-U can have any suitable concave shape. For example, as illustrated in FIG. 8, in many embodiments, such as in the illustrated embodiment, the concave surface 50-U is offset inwardly from a line 52-U tangent to the circumferential rim 46-U and the distal tip 48-U toward the first working end portion axis 34-U. In the illustrated embodiment, the concave surface 50-U has a cross-sectional radius 54-U equal to 2.0 mm. The concave surface 50-U can, however, have any suitable curvature(s). For example, the concave surface 50-U can have the cross-sectional radius (radii) from 1.7 mm to 2.3 mm.

In many embodiments, external surfaces of the first end working portion 32-U (including external surfaces of the circumferential rim 46-U, the distal tip 48-U, and the concave surface 50-U) are surfaces of revolution axially symmetric to the first working end portion axis 34-U. Any suitable configuration of the first end working portion 32-U, however, including non-axially symmetric embodiments of the first end working portion 32-U that include a suitable concave surface 50-U configured to generate a desired complementarily-shaped convex occlusal surface in the dental restoration material 42-U, can be employed.

In the illustrated embodiment, the circumferential rim 46-U has an protruding convex surface shaped for engagement with the dental restoration material 42-U to form a complementarily-shaped concave occlusal surface in the dental restoration material 42-U. The dental tool 10-U can be positioned and oriented to orient the protruding convex surface of the circumferential rim 46-U for engagement with the dental restoration material 42-U. The circumferential rim 46-U can have any suitable protruding convex surface shape. For example, in the illustrated embodiment, the circumferential rim 46-U has a protruding convex surface that includes a toroidal surface segment with a cross-sectional radius equal to 0.25 mm. In the illustrated embodiment, the circumferential rim 46-U has a maximum diameter 46-UMD equal to 3.5 mm. The circumferential rim 46-U, however, can have any suitable maximum diameter 46-UMD (e.g., 3.0 mm to 4.0 mm). In the illustrated embodiment, the distal tip 48-U is disposed 1.65 mm from a plane extending through the circumferential rim 46-U at the maximum diameter 46-UMD. The distal tip 48-U, however, can be disposed at any suitable distance (e.g., 1.5 mm to 1.8 mm) from the plane extending through the circumferential rim 46-U at the maximum diameter 46-UMD.

Figure 9:
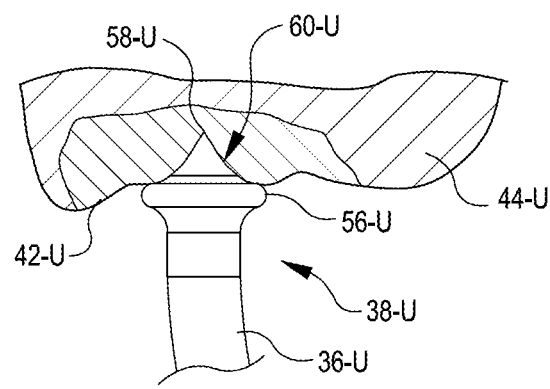
FIG. 9 shows a second working end portion of a second end member of the dental tool of FIG. 6.
Figure 10:
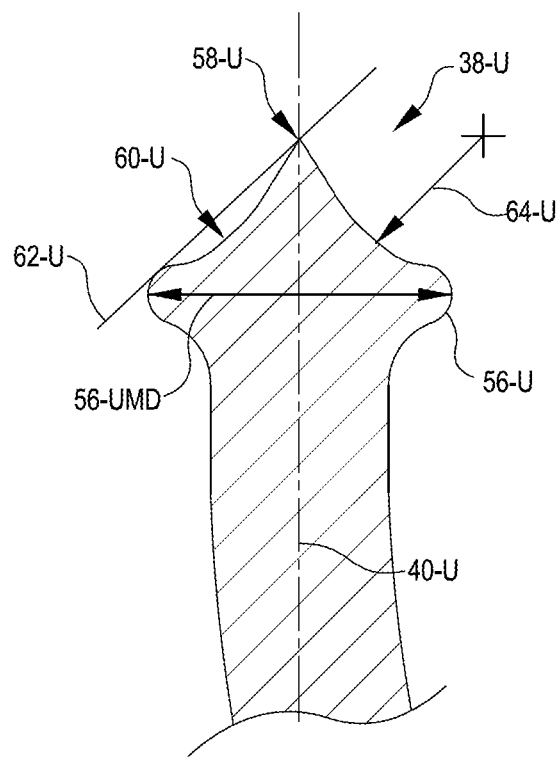
FIG. 10 is a cross-sectional view of the second working end portion of the dental tool of FIG. 6.

FIG. 9 is a close-up view of a second end portion of the dental tool 10-U showing the second end working portion 38-U engaged with a dental restoration material 42-U applied to a upper jaw tooth 44-U. In many embodiments, the second end working portion 38-U includes a circumferential rim 56-U, a distal tip 58-U, and a concave surface 60-U that extends between the circumferential rim 56-U and the distal tip 58-U. The concave surface 60-U is adapted to be engaged with the dental restoration material 42-U to form a complementarily-shaped convex surface in the dental restoration material 42-U. The concave surface 60-U can have any suitable concave shape. For example, as illustrated in FIG. 10, in many embodiments, such as in the illustrated embodiment, the concave surface 60-U is offset inwardly from a line 62-U tangent to the circumferential rim 56-U and the distal tip 58-U toward the second working end portion axis 40-U. In the illustrated embodiment, the concave surface 60-U has a cross-sectional radius 64-U equal to 1.2 mm. The concave surface 60-U can, however, have any suitable curvature(s). For example, the concave surface 60-U can have the cross-sectional radius (radii) from 0.9 mm to 1.5 mm.

In many embodiments, external surfaces of the second end working portion 38-U (including external surfaces of the circumferential rim 56-U, the distal tip 58-U, and the concave surface 60-U) are surfaces of revolution axially symmetric to the second working end portion axis 38-U. Any suitable configuration of the second end working portion 38-U, however, including non-axially symmetric embodiments of the second end working portion 38-U that include a suitable concave surface 60-U configured to generate a desired complementarily-shaped convex occlusal surface in the dental restoration material 42-U, can be employed.

In the illustrated embodiment, the circumferential rim 56-U has an protruding convex surface shaped for engagement with the dental restoration material 42-U to form a complementarily-shaped concave occlusal surface in the dental restoration material 42-U. The dental tool 10-U can be positioned and oriented to orient the protruding convex surface of the circumferential rim 56-U for engagement with the dental restoration material 42-U. The circumferential rim 56-U can have any suitable protruding convex surface shape. For example, in the illustrated embodiment, the circumferential rim 56-U has a protruding convex surface that includes a toroidal surface segment with a cross-sectional radius equal to 0.25 mm. In the illustrated embodiment, the circumferential rim 56-U has a maximum diameter 56-UMD equal to 2.5 mm. The circumferential rim 56-U, however, can have any suitable maximum diameter 56-UMD (e.g., 2.0 mm to 3.0 mm). In the illustrated embodiment, the distal tip 58-U is disposed 1.3 mm from a plane extending through the circumferential rim 56-U at the maximum diameter 56-UMD. The distal tip 58-U, however, can be disposed at any suitable distance (e.g., 1.1 mm to 1.5 mm) from the plane extending through the circumferential rim 56-U at the maximum diameter 56-UMD.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A dental instrument for shaping an occlusal surface of a dental restoration, the dental instrument comprising:

a handle portion; and an end member comprising an elongated portion and a working end portion, the elongated portion being coupled with the handle portion and extending to the working end portion, the working end portion comprising a concave surface shaped to be interfaced with a dental restoration material to shape the dental restoration material to form a convex occlusal surface of the dental restoration, wherein the working end portion comprises a circumferential rim and a distal tip, wherein the concave surface extends from the circumferential rim and converges to the distal tip so as to be offset from a line tangent to the circumferential rim and the distal tip, and wherein the circumferential rim comprises a circumferential rim convex surface shaped to be interfaced with the dental restoration material to shape the dental restoration material to form a concave occlusal surface of the dental restoration.

2. The dental instrument of claim 1, wherein the concave surface is axially symmetric to a working end portion axis that extends through the distal tip.

3. The dental instrument of claim 2, wherein:
the handle portion is elongated along a handle axis; and
the working end portion axis is oriented at about 90 degrees relative to the handle axis.

4. The dental instrument of claim 1, wherein the working end portion is disposed between 30 mm and 50 mm from the handle portion.

5. The dental instrument of claim 1, wherein the circumferential rim has a maximum diameter of less than 5.0 mm.

6. The dental instrument of claim 5, wherein the maximum diameter is between 3.0 mm and 4.0 mm.

7. The dental instrument of claim 6, wherein the distal tip is disposed between 1.1 mm and 1.5 mm from a plane extending through the circumferential rim at the maximum diameter of the circumferential rim.

8. The dental instrument of claim 7, wherein the concave surface has a radius of curvature between 1.2 mm and 1.8 mm.

9. The dental instrument of claim 6, wherein the distal tip is disposed between 1.5 mm and 1.8 mm from a plane extending through the circumferential rim at the maximum diameter of the circumferential rim.

10. The dental instrument of claim 9, wherein the concave surface has a radius of curvature between 1.7 mm and 2.3 mm.

11. The dental instrument of claim 5, wherein the maximum diameter is between 2.0 mm and 3.0 mm.

12. The dental instrument of claim 11, wherein the distal tip is disposed between 1.1 mm and 1.5 mm from a plane extending through the circumferential rim at the maximum diameter of the circumferential rim.

13. The dental instrument of claim 12, wherein the concave surface has a radius of curvature between 0.9 mm and 1.5 mm.

14. The dental instrument of claim 12, wherein the concave surface has a radius of curvature between 2.2 mm and 2.8 mm.

15. The dental instrument of claim 1, wherein the circumferential rim convex surface comprises a toroidal surface segment.

16. The dental instrument of claim 1, further comprising:
a second end member comprising a second elongated portion and a second working end portion, the second elongated portion being coupled with the handle portion and extending to the second working end portion, the second working end portion comprising a second concave surface shaped to be interfaced with a second dental restoration material to shape the second dental restoration material to form a second convex occlusal surface of one or more dental restorations, the second concave surface has a smaller radius of curvature than the concave surface.

17. The dental instrument of claim 16, wherein:
the circumferential rim has a maximum diameter of between 3.0 mm and 4.0 mm;
the distal tip is disposed between 1.5 mm and 1.8 mm from a plane extending through the circumferential rim at the maximum diameter of the circumferential rim;
the concave surface has a radius of curvature between 1.7 mm and 2.3 mm;
the second working end portion comprises a second circumferential rim and a second distal tip;
the second concave surface extends from the second circumferential rim and converges to the second distal tip so as to be offset from a second line tangent to the second circumferential rim and the second distal tip;
the second circumferential rim has a second maximum diameter of between 2.0 mm and 3.0 mm;
the second distal tip is disposed between 1.1 mm and 1.5 mm from a second plane extending through the second circumferential rim at the second maximum diameter of the second circumferential rim; and
the second concave surface has a radius of curvature between 0.9 mm and 1.5 mm.

18. The dental instrument of claim 16, wherein:
the circumferential rim has a maximum diameter of between 2.0 mm and 3.0 mm;
the distal tip is disposed between 1.1 mm and 1.5 mm from a plane extending through the circumferential rim at the maximum diameter of the circumferential rim;
the concave surface has a radius of curvature between 2.2 mm and 2.8 mm;
the second working end portion comprises a second circumferential rim and a second distal tip;
the second concave surface extends from the second circumferential rim and converges to the second distal tip so as to be offset from a second line tangent to the second circumferential rim and the second distal tip;
the second circumferential rim has a second maximum diameter of between 3.0 mm and 4.0 mm;
the second distal tip is disposed between 1.1 mm and 1.5 mm from a second plane extending through the second circumferential rim at the second maximum diameter of the second circumferential rim; and
the second concave surface has a radius of curvature between 1.2 mm and 1.8 mm.

* * * * *